(12) United States Patent
Wang

(10) Patent No.: US 12,401,770 B1
(45) Date of Patent: Aug. 26, 2025

(54) CAMERA AND WAKE-UP METHOD THEREOF

(71) Applicant: TP-Link Systems Inc., Irvine, CA (US)

(72) Inventor: Lin Wang, Shenzhen (CN)

(73) Assignee: TP-Link Systems Inc., Irvine, CA (US)

( * ) Notice: Subject to any disclaimer, the term of this patent is extended or adjusted under 35 U.S.C. 154(b) by 0 days.

(21) Appl. No.: 19/015,584

(22) Filed: Jan. 9, 2025

(51) Int. Cl.
*H04N 7/18* (2006.01)
*H04N 23/661* (2023.01)

(52) U.S. Cl.
CPC ............ *H04N 7/188* (2013.01); *H04N 7/183* (2013.01); *H04N 23/661* (2023.01)

(58) Field of Classification Search
CPC ...... H04N 7/188; H04N 7/183; H04N 23/661; H04N 7/186
See application file for complete search history.

(56) References Cited

U.S. PATENT DOCUMENTS

| | | | | |
|---|---|---|---|---|
| 9,906,722 | B1* | 2/2018 | Gigot | H04N 23/651 |
| 10,178,741 | B1* | 1/2019 | Shah | F21V 33/0076 |
| 11,297,218 | B1* | 4/2022 | Nadeau | G08B 25/10 |
| 12,200,357 | B2* | 1/2025 | Xu | H04N 7/183 |
| 2012/0327225 | A1* | 12/2012 | Barley | H04N 7/185 |
| | | | | 348/143 |
| 2012/0327242 | A1* | 12/2012 | Barley | H04N 23/61 |
| | | | | 348/155 |
| 2013/0089313 | A1* | 4/2013 | Clark | H04N 23/74 |
| | | | | 396/164 |
| 2014/0267716 | A1* | 9/2014 | Child | H04N 7/186 |
| | | | | 348/143 |
| 2015/0156031 | A1* | 6/2015 | Fadell | G08B 27/003 |
| | | | | 700/90 |
| 2017/0341611 | A1* | 11/2017 | Baker | B60R 21/16 |
| 2018/0302559 | A1* | 10/2018 | Lee | H04N 23/667 |
| 2019/0222756 | A1* | 7/2019 | Moloney | H04N 23/45 |
| 2020/0412863 | A1* | 12/2020 | He | H04N 1/00885 |
| 2023/0269462 | A1* | 8/2023 | Xu | G06V 10/147 |
| | | | | 348/372 |

FOREIGN PATENT DOCUMENTS

| | | | |
|---|---|---|---|
| CN | 105472318 A | 4/2016 |
| CN | 113507567 A | 10/2021 |
| CN | 117061864 A | 11/2023 |

* cited by examiner

*Primary Examiner* — Jared Walker
(74) *Attorney, Agent, or Firm* — Loeb & Loeb LLP

(57) ABSTRACT

The present disclosure provides a method for waking up a camera and apparatus thereof. The method includes: acquiring at least one wake-up signal for waking up the camera; performing pre-determined signal processing on the acquired wake-up signal to extract indicative features; determining wake-up scenario information corresponding to the acquired wake-up signal based on the indicative features; determining, based on the determined wake-up scenario information, an activation scheme corresponding to the wake-up scenario information, wherein the activation scheme defines activation priority at least one functional module in the camera in the wake-up scenario; and activating at least one functional module based on activation priority defined in the determined activation scheme.

20 Claims, 4 Drawing Sheets

CAMERA AND WAKE-UP METHOD THEREOF

TECHNICAL FIELD

The present disclosure relates to an electronic device, and more particularly to a camera and a wake-up method thereof.

BACKGROUND

In order to save power, a camera can be kept in a dormant state, for example, at least some functional modules of the camera are in a stand-by mode. This can be done especially in the field of security monitoring. The camera is awakened and enters into a working state only when it is needed in a specific situation, and its corresponding functional modules can be used then.

The more functions a camera supports, the more function modules need to be activated, and the corresponding total activation time is longer. Therefore, a method for optimizing the camera wake-up to reduce the user's waiting time is needed.

SUMMARY

In view of the above problem, the present disclosure provides a method for waking up a camera and a corresponding camera apparatus.

According to one aspect of the present disclosure, a method of waking up a camera is provided, including: acquiring at least one wake-up signal for waking up the camera; performing pre-determined signal processing on the acquired wake-up signal to extract indicative features; determining wake-up scenario information corresponding to the acquired wake-up signal based on the indicative features; determining, based on the determined wake-up scenario information, an activation scheme corresponding to the wake-up scenario information, wherein the activation scheme defines activation priority at least one functional module in the camera in the wake-up scenario; and activating at least one functional module based on activation priority defined in the determined activation scheme.

In one embodiment, the at least one wake-up signal is acquired via at least one of a sensor and a network communication module.

In one embodiment, the sensor is configured to detect the presence of a target object to generate the wake-up signal, and the network communication module is configured to obtain a user request via the network and generate the wake-up signal based on the user request.

In one embodiment, the wake-up signal is acquired in response to at least one of the following events: detecting the presence of a target object, receiving a request for viewing real-time feed; and receiving a request for watching a recorded video.

In one embodiment, in response to the request for viewing the real-time feed is received, the wake-up signal comprises the indicative features indicating that the request is a request for a real-time feed, or in response to the request for watching the recorded video is received, the wake-up signal includes the indicative features indicating that the request is a request for watching the recorded video.

In one embodiment, determining the activation scheme corresponding to the wake-up scenario information is further based on at least one of: network conditions, user preferences, remaining power conditions and camera function configurations.

In one embodiment, the at least one functional module comprises at least one of: an audio and video data acquisition module, a monitoring object analysis module, a memory management module, and an audio and video data transmission module.

In one embodiment, in response to acquiring the wake-up signal due to detection of the presence of the target object, it is determined that the wake-up scenario information indicates a target trigger scenario, and a first activation scheme is determined in which the audio and video data collection module has the highest activation priority, and the monitoring object analysis module has the second highest activation priority; or in response to acquiring the wake-up signal due to reception of the request for viewing the real-time feed, it is determined that the wake-up scenario information indicates the scenario of triggering the real-time feed, and a second activation scheme is determined in which the audio and video data collection module has the highest activation priority, and the audio and video data transmission module has the second highest activation priority; or in response to acquiring the wake-up signal due to reception of the request for watching the video, it is determined that the wake-up scenario information indicates the scenario of triggering the recorded video, and a third activation scheme is determined in which the audio and video data collection module has the highest activation priority, and the memory management module has the second highest priority.

In one embodiment, the network communication module is an Internet of Things (IoT) Wi-Fi module and the sensor is a passive infrared sensor (PIR) sensor.

In one embodiment, the indicative features are associated with at least one of signal source of the wake-up signal and content included in the wake-up signal.

According to another aspect of the present disclosure, a camera is provided, which includes: a wake-up signal acquisition module configured to acquire at least one wake-up signal for waking up the camera; a microprocessor configured to perform pre-determined signal processing on the acquired wake-up signal to extract indicative features, and determine wake-up scenario information corresponding to the wake-up signal based on the indicative features; and a main chip configured to be woken up in response to the wake-up signal sent by a microprocessor and including a plurality of functional modules each configured to implement at least one function of a camera, wherein the main chip is further configured to determine an activation scheme corresponding to the wake-up scenario information based on the wake-up scenario information received from the microprocessor, wherein the activation scheme defines activation priority of at least one functional module in the camera in the wake-up scenario, and activate the at least one functional module based on the activation priority defined in the determined activation scheme.

In one embodiment, the wake-up signal acquisition module comprises a sensor and a network communication module.

In one embodiment, the sensor is configured to detect the presence of a target object, and the network communication module is configured to obtain a user request via a network.

In one embodiment, the wake-up signal acquisition module acquires the wake-up signal in response to at least one of: a presence of a target object within a monitoring area of the camera, receiving a request for viewing real-time feed, and receiving a request for watching a recorded video. In the case that the camera is a surveillance camera, the recorded video is a recorded surveillance video.

In one embodiment, in response to receiving request for viewing the real-time feed, the wake-up signal includes the indicative features indicating that the request is a request for a real-time feed, or in response to receiving a request for watching the recorded video, the wake-up signal includes the indicative features indicating that the request is a request for watching the recorded video.

In one embodiment, the main chip is configured to determine the activation scheme corresponding to the wake-up scenario information based on the wake-up scenario information and at least one of network conditions, user preferences, remaining power conditions and camera function configurations.

In one embodiment, the plurality of functional modules include at least one of: an audio and video data acquisition module, a monitoring object analysis module, a memory management module, and an audio and video data transmission module.

In one embodiment, in response to the wake-up signal acquisition module acquiring the wake-up signal due to detection of the presence of the target object, the microprocessor is configured to determine that the wake-up scenario information indicates a target trigger scenario, and the main chip is configured to determine a first activation scheme in which the audio and video data collection module has the highest activation priority, and the monitoring object analysis module has the second highest activation priority; or in response to the wake-up signal acquisition module acquiring the wake-up signal due to reception of the request for viewing the real-time feed, the microprocessor is configured to determine that the wake-up scenario information indicates the scenario of triggering the real-time feed, and the main chip is configured to determine a second activation scheme is determined in which the audio and video data collection module has the highest activation priority, and the audio and video data transmission module has the second highest activation priority; or in response to the wake-up signal acquisition module acquiring the wake-up signal due to reception of the request for watching the video, the microprocessor is further configured to determine that the wake-up scenario information indicates the scenario of triggering the recorded video, and the main chip is configured to determine a third activation scheme in which the audio and video data collection module has the highest activation priority, and the memory management module has the second highest priority.

In one embodiment, the network communication module is an Internet of Things (IoT) wireless communication module and the sensor is a passive infrared sensor (PIR) sensor.

In one embodiment, the indicative features are associated with at least one of signal source of the wake-up signal and content included in the wake-up signal.

In one embodiment, the camera includes a surveillance camera connected to a network.

At least based on the above-mentioned embodiments of the present disclosure, the present disclosure obtains the wake-up signal, distinguishes different wake-up scenarios, and adjusts the activation order of functional modules according to different wake-up scenarios, thereby speeding up the camera's response to the wake-up scenario, allowing the user to view the desired content from the camera faster and earlier.

DETAILED DESCRIPTION

Figure 1:
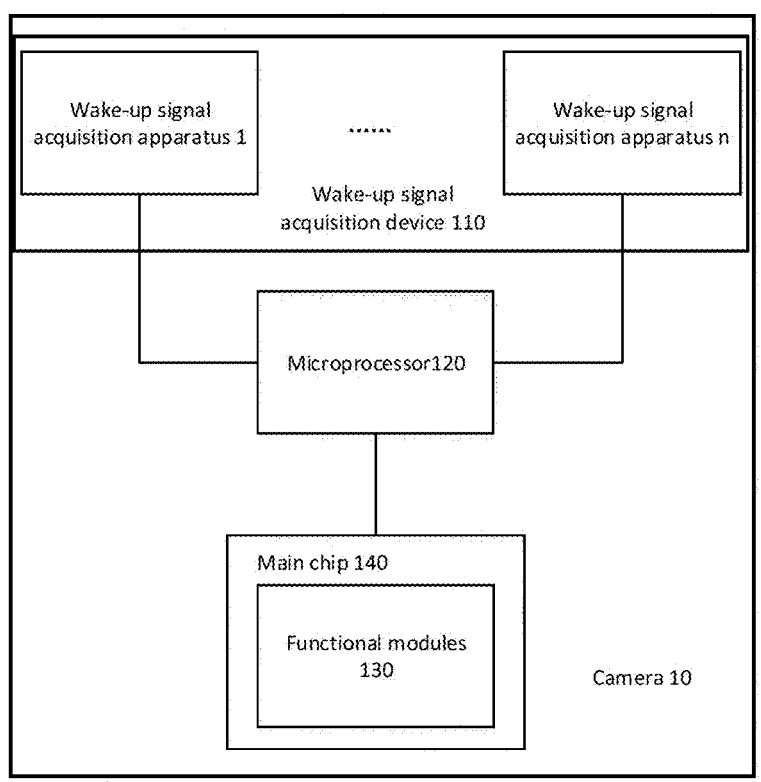
FIG. 1 illustrates a camera according to an embodiment of the present disclosure.

Before undertaking the DETAILED DESCRIPTION below, it may be advantageous to set forth definitions of certain words and phrases used throughout this patent document. The terms "include" and "comprise," as well as derivatives thereof, mean inclusion without limitation. The term "or" is inclusive, meaning and/or.

Moreover, various functions described below may be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as Read-Only Memory (ROM), Random Access Memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data may be permanently stored and media where data may be stored and later overwritten, such as a rewritable optical disc or an erasable memory device.

It should be understood that "first," "second," and similar words used in this disclosure do not denote any order, quantity, or importance, but are merely used to distinguish between different components. Unless the context clearly indicates otherwise, the singular forms "a," "an," "the," and similar words do not denote a limitation of quantity, but rather denote the presence of at least one.

The various embodiments discussed below to describe the principles of the present disclosure in this patent document are by way of illustration only and should not be construed in any way to limit the scope of the disclosure.

The following description with reference to the accompanying drawings is provided to assist in a comprehensive understanding of various embodiments of the present disclosure as defined by the claims and their equivalents. This description includes various specific details to assist in that understanding but are to be regarded as merely exemplary. Accordingly, those of ordinary skill in the art will recognize that various changes and modifications may be made to the various embodiments described herein without departing from the scope and spirit of the present disclosure. In addition, descriptions of well-known functions and constructions may be omitted for clarity and conciseness.

Unless defined differently, all terms (including technical terms or scientific terms) used in this disclosure have the same meaning as understood by those skilled in the art to which this disclosure belongs. Common terms as defined in dictionaries are interpreted to have meanings consistent with the context in the relevant technical field, and should not be interpreted ideally or overly formally unless expressly so defined in this disclosure.

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

In order to save power, the main components of the camera may enter into a sleep mode. The main components of the camera may include one or more functional modules. The more functions the camera supports, the more functional modules need to be activated, and the corresponding total activation time is longer. And whichever module activates first, the functions it supports may be used first.

The event that wakes up the camera involves different scenarios, which for example, may be an object appearing in the monitoring area, receiving a request for watching a real-time feed, or receiving a request for watching a recorded video. In the case that the camera is a surveillance camera, the recorded video is a recorded surveillance video.

It would be advantageous that the specific event for waking up the camera is determined before activating the modules, since the specific event may be analyzed to determine the corresponding user needs behind the event, and thereby the function modules corresponding to the user needs are activated first based on the user needs when activating the function modules, which will increase the speed at which the camera responds to events. For example, when the wake-up event is the presence of an object in the monitored area, the user usually wants to activate modules associated with audio and video data collection as well as monitored object analysis as early as possible in order to analyze whether the monitored object is a person, a vehicle, or a pet, etc. For another example, when the wake-up event is receiving a request for watching the real-time feed, the user usually wants to activate modules associated with audio and video data collection and audio and video data transmission as early as possible so that the user can see the real-time feed as quickly as possible. For another example, when the wake-up event is receiving a request for watching the video, the user usually wants to activate modules associated with audio and video data acquisition, audio and video data transmission and memory management as early as possible so that the user can see the video as soon as possible.

Based on the above concept, the present disclosure proposes a method for quickly waking up a camera, so that a user can view desired camera content faster and earlier. More specifically, the present disclosure proposes a method for preferentially activating functional modules in a camera that are closely related to a wake-up scenario, thereby enabling a user to achieve a purpose corresponding to the wake-up scenario faster and earlier.

In an embodiment, the present disclosure acquires a wake-up signal, distinguishes different wake-up scenarios, adjusts the activation sequence of functional modules according to different wake-up scenarios, activates functional modules related to the wake-up scenario in advance, and delays activation of functional modules that are not closely related to the wake-up scenario and thus speeding up the camera's response to the wake-up scenario.

FIG. 1 illustrates an example camera according to embodiments of the present disclosure.

The camera 10 shown in FIG. 1 may include: a wake-up signal acquisition module 110, a microprocessor 120, and a main chip 140 including a plurality of functional modules 130.

As an example, the wake-up signal acquisition module 110 may be connected to the microprocessor and communicate with the microprocessor 120; The microprocessor 120 may be connected to the main chip 140 and communicate with the main chip, such as waking up the main chip 140 and sending a signal to the main chip 140. The main chip may also be called a System on a Chip ("SOC" for short), which integrates the plurality of functional modules 130. When the camera is awakened, the main chip 140 can control the activation of the plurality of functional modules 130.

The plurality of functional modules 130 may include at least one functional module each for implementing a specific function of the camera.

In one embodiment, the camera may be a surveillance camera connected to a network, which may be powered by a battery. The specific functions of the camera may include: collecting audio and/or video; analyzing objects appearing in the monitoring area; storing and managing the collected audio and/or video; and transmitting audio and/or video (for example, after necessary encoding/decoding).

A camera according to an embodiment of the present disclosure may have two operating modes, one mode being an active mode in which all its components are turned on and working; while another mode is the sleep mode or standby mode. In this mode, the plurality of functional modules 130 and the main chip 140 are in a sleep state and do not work, while the wake-up signal acquisition module 110 and the microprocessor 120 are in a working state. For example, the wake-up signal acquisition module 110 and the microprocessor 120 may be continuously powered by a battery, continuously working in low power consumption mode.

In one embodiment, the wake-up signal acquisition module 110 may be configured to acquire at least one of a variety of wake-up signals for waking up the camera. The wake-up signal acquisition module 110 may include a plurality of wake-up signal acquisition apparatuses (wake-up signal acquisition apparatus 1, wake-up signal acquisition apparatus 2, . . . wake-up signal acquisition apparatus n), wherein each wake-up signal acquisition apparatus may acquire one type of wake-up signal. The microprocessor 120 may be configured to perform pre-determined signal processing on the wake-up signal received from wake-up signal acquisition module 110 to extract indicative features in the wake-up signal, and determine wake-up scenario information corresponding to the wake-up signal based on the indicative features of the wake-up signal. In an embodiment, the pre-determined signal processing could identify the signal source and the signal contents. For example, by pre-determined signal processing, which wake-up signal acquisition apparatus the signal is from may be identified with the signal source, and indicative features indicating the wake-up cause or scenario may be extracted from the signal content.

Each of the plurality of functional modules 130 may be configured to implement at least one function of the camera. The main chip 140 is configured to receive a wake-up signal and wake-up scenario information from the microprocessor 120, and be awakened in response to the wake-up signal received from the microprocessor 120, determine an activation scheme corresponding to the wake-up scenario information from a pre-set plurality of activation schemes based on the wake-up scenario information received from the microprocessor 120, wherein the plurality of activation schemes define activation priorities of a plurality of functional modules in the camera in different wake-up scenarios, and activate the plurality of functional modules 130 based on the activation priorities of the plurality of functional modules 130 defined in the determined activation scheme.

In a further embodiment, the wake-up signal acquisition module 110 may be implemented to include a sensor and a network communication module, but this is only an example, and its implementation is not limited thereto. The sensor may be configured to detect the presence of the target object, and the network communication module may be configured to obtain the user request via the network.

As an example, the network communication module may be implemented as an Internet of Things (IoT) wireless communication module, which may connect to the network through Wi-Fi, NB-IoT, etc. In the case of the IoT wireless communication module can connect to the network through Wi-Fi, the IoT wireless communication module may be referred to as an IoT Wi-Fi module. The IoT Wi-Fi module can connect to the network through direct distribution, smart distribution or WEB distribution.

Through the wireless communication module, the security device (which is a camera herein) and the user device (for example, APP(s) in a mobile phone) may be interconnected. In the embodiment of the present disclosure, the security device is a camera. After interconnection, the camera may be remotely controlled through the APP(s) in the mobile phone. In response to receiving a request for viewing the real-time feed or a request for viewing a recorded video through the App(s) in the mobile phone, the wireless communication module in the wake-up signal acquisition module 110 can generate wake-up signals corresponding to these requests.

As an example, the sensor may be implemented as a passive infrared sensor (PIR) sensor. The PIR sensor is an electronic component capable of detecting infrared radiation emitted by a human body or other object.

PIR sensors are widely used in the security field, mainly to detect intruders. Using PIR sensors in the surveillance cameras can improve the efficiency of the entire security system. In response to a human body entering the sensing range of the sensor, the sensor generates a current change to generate a wake-up signal.

The wake-up signal acquisition module 110 may acquire a wake-up signal periodically or in response to the occurrence of a particular event. For example, the wake-up signal acquisition module 110 acquires the wake-up signal in response to at least one of the following events: the appearance of a target object in the monitoring area of the camera, receiving a request for viewing real-time feed, and receiving a request for watching the recorded video. For another example, the wake-up signal acquisition module may determine whether there is a wake-up signal for waking up the camera at a pre-determined period.

Embodiments of the present disclosure relate to methods of waking up the camera in the sleep mode when the camera is in a sleep state.

Figure 2:
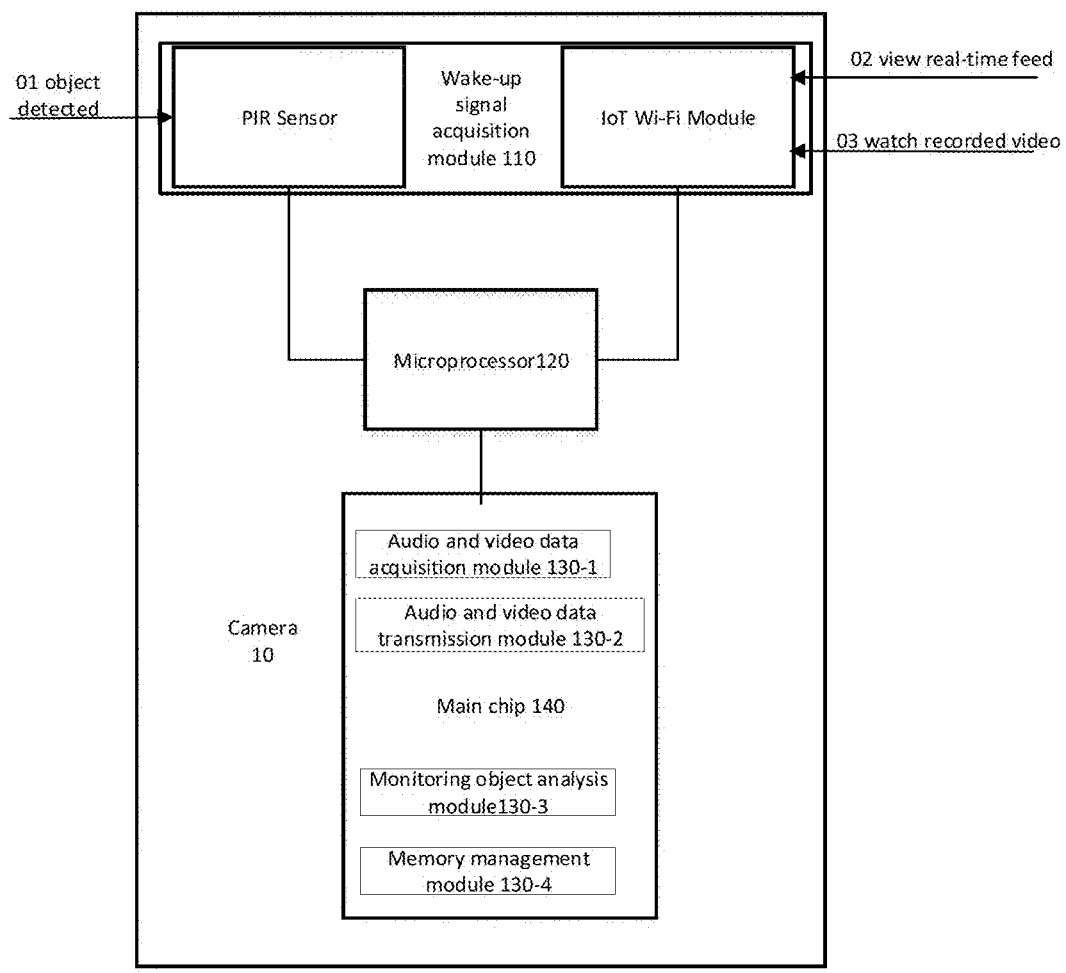
FIG. 2 illustrates an example camera according to another embodiment of the present disclosure.

FIG. 2 illustrates an example camera according to another embodiment of the present disclosure. In FIG. 2, the wake-up signal acquisition module is implemented as including a PIR sensor and an IoT Wi-Fi module. At this time, the wake-up signal is generated by the PIR sensor and/or the IoT Wi-Fi module respectively.

In response to there being an object (such as a person, a vehicle, or a pet etc.) present in the monitored area (which may be referred to as wake-up scenario 1 or object triggering scenario in this disclosure), the PIR sensor generates a wake-up signal 1 and sends the signal to the microprocessor. In response to receiving the request for viewing the real-time feed or the recorded video, the IoT Wi-Fi module can receive the request for viewing the real-time feed (which may be referred to as wake-up scenario 2 or scenario of triggering real-time feed in this disclosure) or watch the recorded video (which may be referred to as wake-up scenario 3 or scenario of triggering recorded video in this disclosure).

Subsequently, the IoT Wi-Fi module will parse the request content and generate wakeup signal 2 or wakeup signal 3 based on the parsed request content including indicative features.

In response to receiving the wake-up signal from the PIR sensor, the microprocessor can determine the wake-up scenario is the wake-up scenario 1.

When the microprocessor 120 receives the wake-up signal from the IoT Wi-Fi module, the microprocessor 120 can also determine the wake-up scenario information based on the content of the wake-up signal (such as wake-up signal 2 or wake-up signal 3), that is, determine whether the wake-up signal corresponds to the wake-up scenario 2 or the wake-up scenario 3.

Although only three wake-up scenarios are shown in the above example, the camera may be implemented to be awakened in response to more wake-up scenarios.

The plurality of functional modules 130 may include at least one of the following: an audio and video data collection module 130-1 configured to collect audio and/or video, an audio and video data transmission module 130-2 configured to collect audio and/or video, a monitoring object analysis module 130-3 configured to analyze objects appearing in the screen, and a memory management module 130-4 configured to store and manage the collected audio and/or video.

In a specific embodiment, the audio and video data collection module 130-1 may include a signal processor, an image processor, an audio codec, and a video codec. The audio and video data transmission module 130-2 may include a transmission protocol module, a network interface and a buffer. The monitoring object analysis module 130-3 may include an image processing module, a feature extraction module, an object recognition module, and a behavior analysis module. The memory management module 130-4 may include a memory controller, a cache management unit, and a data storage unit.

The types of functional modules described above are only examples, and the camera may include other functional modules adapted to the functions it can provide.

Figure 3:
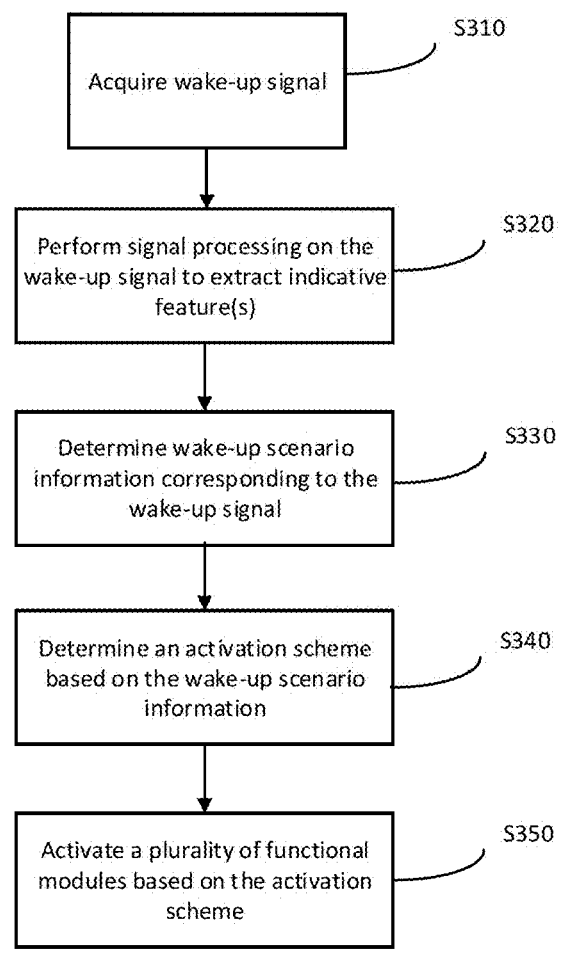
FIG. 3 illustrates an example method of waking up a camera according to an embodiment of the present disclosure.

FIG. 3 illustrates an example method of waking up a camera according to an embodiment of the present disclosure.

A method for waking up a camera according to an embodiment of the present disclosure includes: in step S310, obtaining at least one wake-up signal for waking up the camera. The at least one wake-up signal described herein may be acquired via wake-up signal acquisition module 110.

In the case of the wake-up signal acquisition module 110 is implemented via at least one of a sensor and a network communication module, the wake-up signal may be acquired in response to at least one of the following events: the sensor detects the presence of a target object within the monitoring area of the camera, the network communication module receives a request (e.g., sent by the user) to view the real-time feed, or the network communication module receives a request (e.g., sent by the user) to view the recorded video.

In step S320, predetermined signal processing is performed on the acquired wake-up signal to extract indicative features in the acquired wake-up signal. The indicative features may indicate the acquisition method or acquisition source of the wake-up signal. For example, In the case that the wake-up signal involves a request for viewing the real-time feed, the indicative features extracted after signal processing may indicate that the wake-up is in response to the request for the real-time feed. In the case that the wake-up signal involves a request for viewing the recorded video, the indicative features extracted after signal processing may indicate that the wake-up is in response to the request for watching the recorded video. For another example, In the case that the presence of a target object is detected within the monitoring area of the camera, the indicative features extracted after signal processing may indicate that the source of the wake-up signal is a sensor.

In step S330, the wake-up scenario information corresponding to the acquired wake-up signal is determined based on the indicative features of the wake-up signal. In an embodiment, determining the wake-up scenario information based on the wake-up signal comprises determining the wake-up scenario information based on at least one of a signal source of the wake-up signal and content included in the wake-up signal. In response to acquiring multiple wake-up signals, multiple wake-up scenario information respectively corresponding to the wake-up signal may be determined.

In step S340, an activation scheme corresponding to the wake-up scenario information is determined based on the determined wake-up scenario information, wherein the activation scheme defines activation priority of at least one functional module included in the camera in different wake-up scenarios. In one embodiment, the activation scheme may be one of a plurality of pre-set activation schemes.

As mentioned above, in response to acquiring multiple wake-up signals, multiple wake-up scenario information corresponding to this wake-up information may be determined. In this case, when determining the activation scheme, different processing priorities in the activation scheme may be set for multiple wake-up scenarios.

For example, the processing priorities of the above three scenarios may be set as follows: processing priority for target-triggered scenario <processing priority for scenario of triggering real-time feed <processing priority for scenario of triggering recorded scenarios. In this way, in response to receiving a plurality of wake-up signals simultaneously, for example, when in response to receiving the wake-up signals due to the target trigger scenario and the scenario of triggering real-time feed, the plurality of functional modules of the camera may be activated based on the activation scheme corresponding to the scenario of triggering the real-time feed according to the processing priority.

In an embodiment, the activation priorities of the at least one functional modules in the plurality of functional modules in one activation scheme may be the same or different. When the activation priorities of two functional modules in the activation schemes are the same, it means that the two functional modules may be activated at the same time.

In addition, only some functional modules among the plurality of functional modules can have their activation priorities set in the activation scheme. For example, only the priorities of several functional modules closely related to the wake-up scenario information are set in the activation scheme. Taking the wake-up scenario information indicating receiving the request for viewing the real-time feed as an example, the activation priorities of the audio and video data collection module and the audio and video data transmission module may be set in the activation scheme. At this time, the remaining functional modules that do not have their priorities set may be activated after several prioritized functional modules that have their priorities set are activated.

In one embodiment, if the wake-up signal is obtained in response to the sensor detecting the presence of the target object in the monitoring area of the camera, it may be determined that the wake-up scenario information indicates the target trigger scenario, and a first activation scheme is determined. In the first activation scheme, the activation priority of the audio and video data acquisition module is the highest priority, and the activation priority of the monitoring object analysis module is the second highest priority. The target triggering scenario may refer to a scenario in which a target object is detected in the monitoring area to trigger the wake-up of the camera followed by object analysis operation.

In one embodiment, if the wake-up signal is obtained in response to the network communication module receiving a request (e.g., sent by the user) to view the real-time feed, it may be determined that the wake-up scenario information indicates a scenario of triggering the real-time feed, and a second activation scheme is determined. In the second activation scheme, the activation priority of the audio and video data collection module is the highest priority, and the activation priority of the audio and video data transmission module is the second highest priority. The scenario of triggering the real-time feed may refer to a scenario in which the request (e.g., sent by the user) to view the real-time feed is received which is aimed as triggering the wake-up of the camera and then the view of the real-time feed.

In one embodiment, if the wake-up signal is obtained in response to the network communication module receiving a request (e.g., sent by the user) to watch the video, it may be determined that the wake-up scenario information indicates scenario of triggering the recorded video, and a third activation is determined. In the third activation scheme, the audio and video data collection module has the highest activation priority, and the memory management module has the second highest activation priority. The scenario of triggering the recorded video may refer to a scenario in which the request (e.g., sent by the user) to watch the recorded video is received which is aimed as triggering the wake-up of the camera and then the view of the recorded video.

Through the above embodiments, different activation orders for the plurality of functional modules may be set according to different wake-up scenarios. For example, when the object is detected, the object type (person, vehicle, or pet etc.) may be analyzed earlier; when the request for viewing the real-time feed is received, audio and video data is transmitted earlier so that users can see the real-time feed as soon as possible; and when the request for watching the video is received, the video is read from the memory and transmitted earlier, so that the user can see the video as soon as possible, thereby improving the user experience.

In a further embodiment, determining the activation scheme corresponding to the wake-up scenario information may be further based on at least one of: network conditions, user preferences, remaining power conditions, and camera function configurations. More specifically, the priority of each functional module in the activation scheme may be set based on network conditions, user preferences, remaining power conditions, and camera function configurations. For example, if according to the user's preference, he or she hopes to activate one specific functional module first at any scenarios, this functional module may be prioritized in all the activation schemes. For another example, if the network condition is not so good, the module related to transmitting the video could be given a lower activation priority and be activated later in all the activation schemes. For another example, if the camera is almost out of battery, the module related to analyze the object could be given the highest activation priority at any activation schemes.

In step S350, the at least one functional module are activated based on the activation priority defined in the determined activation scheme. In a further embodiment, the functional modules that do not have their priorities set in the activation scheme may be activated after the at least one functional module is activated. And when all the functional modules are activated, the camera is wakened up completely and can work properly.

In one embodiment, in the case that the wake-up context information indicates a target trigger scenario, the plurality of functional modules are activated in the first activation scheme, wherein at least the audio and video data acquisition module and the monitoring object analysis module are activated first based on the activation priority of the audio and video data acquisition module in the activation scheme being the highest priority and the activation priority of the monitoring object analysis module in the activation scheme being the second highest priority.

In another embodiment, in the scenario of triggering the real-time feed, the plurality of function modules are activated in the second activation scheme, wherein at least the audio-video data collection module and the audio-video data transmission module are activated first based on the activation priority of the audio-video data collection module in the activation scheme being the highest priority and the activation priority of the audio-video data transmission module in the activation scheme being the second highest priority.

In a further embodiment, in the scenario of triggering the recorded video, activate the plurality of functional modules in a third activation scheme, wherein at least based on the activation priority of the audio and video data collection module in the activation scheme being the highest priority and the activation priority of the memory management module in the activation scheme being the second highest priority to activate the audio and video data collection module and the memory management module first.

The following describes the method of waking up the camera in this scenario by taking the target triggering scenario as an example.

First, as described in step S310, a wake-up signal for waking up the camera is obtained. In response to a target object appears in the monitoring area of the camera, the wake-up signal acquisition module 110 (e.g., a sensor) generates the wake-up signal.

In step S320, pre-determined signal processing is performed on the obtained wake-up signal to extract the indicative feature in the obtained wake-up signal. The indicative feature can indicate that the acquisition source of the wake-up signal is the sensor.

In step S330, based on the indicative feature of the wake-up signal, the wake-up scenario information corresponding to the obtained wake-up signal is determined. At this time, it may be determined that the wake-up scenario information is associated with the target object appearing in the monitoring area of the camera, that is, it involves the target triggering scenario.

In step S340, based on the determined wake-up scenario information, an activation scheme corresponding to the wake-up scenario information is determined, wherein the activation scheme defines the activation priority of at least one functional module among the plurality of functional modules included in the camera in different wake-up scenarios.

In response to the wake-up scenario information being associated with the presence of the target object detected in the monitoring area of the camera, it may be determined that the first activation scheme is used to activate each functional module of the camera. In the first activation scheme, the activation priority of the audio and video data acquisition module is the highest priority, and the activation priority of the monitoring object analysis module is the second highest priority. In the first activation scheme, the priority of other functional modules may be further set. For example, the priority of each functional module may be ranked from high to low in the following order: audio and video data acquisition module, audio and video data transmission module, monitoring object analysis module, and memory management module.

In step S350, the at least one functional module is activated based on the activation priority defined in the determined activation scheme. In a further embodiment, the functional modules that do not have their priorities set in the activation scheme may be activated after the at least one functional module is activated. And when all the functional modules are activated, the camera is wakened up completely and can work properly.

In the case that the wake-up scenario information indicates the target triggering scenario, the plurality of functional modules are activated according to the first activation scheme, in which scheme at least based on the activation priority of the audio and video data acquisition module being the highest priority and the activation priority of the monitoring object analysis module in the activation scheme being the second highest priority, the audio and video data acquisition module and the monitoring object analysis module are activated first. In a further embodiment, the priority of each functional module in the first activation scheme may be ranked from high to low in the following order: audio and video data acquisition module, audio and video data transmission module, monitoring object analysis module, and memory management module. Based on the activation priority setting of each functional module in the activation scheme, all functional modules may be activated one by one, so that the camera may be fully awakened and may enter into a normal working state.

The present disclosure obtains a wake-up signal through a wake-up signal acquisition device, distinguishes different wake-up scenarios through a microprocessor, determines the activation order of each functional module according to differentiated wake-up scenario, prioritizes activation of functional modules closely related to the wake-up scenario, and delays activation of functional modules irrelevant to the wake-up event, thereby speeding up the response speed of the camera to wake-up events and improving user experience.

Figure 4:
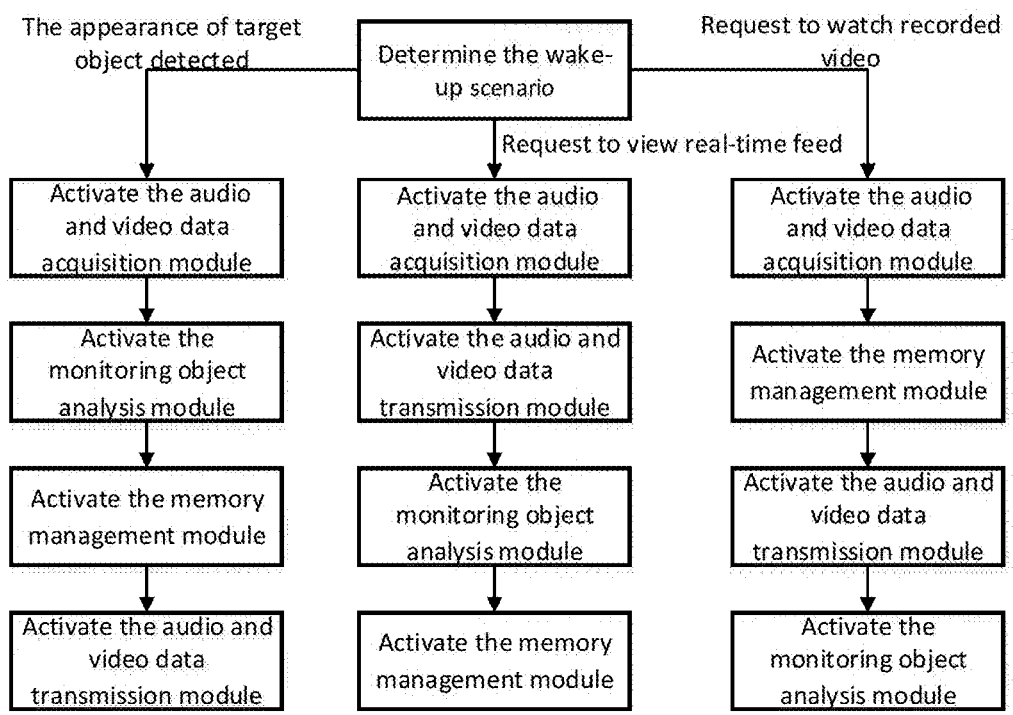
FIG. 4 illustrates an example method flowchart for determining a wake-up scheme according to a wake-up scenario information according to an embodiment of the present disclosure.

FIG. 4 illustrates an example flowchart of determining an activation scheme based on a wake-up scenario information, according to one embodiment of the present disclosure.

As an example, in response to determining that the wake-up scenario is the monitored appearance of the target object, that is, the target trigger scenario, the priority ordering of each functional module in the activation scheme from high to low may be: audio and video data collection module at first, then monitoring object analysis module, followed by memory management module, and audio and video data transmission module at last.

In response to determining that the wake-up scenario is a request for viewing the real-time feed, the priority ordering of each functional module in the activation scheme from high to low may be: audio and video data collection module at first, then audio and video data transmission module, followed by monitoring object analysis module, and memory management module at last.

In response to determining the wake-up scenario is a request for watching the recorded video, the priority ordering of each functional module in the activation scheme from high to low may be: audio and video data collection module at first, then memory management module, followed by audio and video data transmission module, and monitoring object analysis module at last. In other examples, there may be different priority rankings, and the priority rankings may change depending on network conditions, user preferences, remaining power conditions, camera function configurations, and the like. For example, if according to the user's preference, he or she hopes to activate one specific functional module first at any scenarios, this functional module may be prioritized in all the activation schemes. For another example, if the network condition is not so good, the audio and video data transmission module could be given a lower activation priority and be activated later in all the activation schemes. For another example, if the camera is almost out of battery, the monitoring object analysis module could be given the highest activation priority at any activation schemes.

Each function module is activated in order of the set priority. In response to determining that the wake-up scenario is the monitored appearance of the target object, that is, the target trigger scenario, the audio and video data collection module, the monitoring object analysis module, the memory management module, and the audio and video data transmission module may be activated respectively in order according to their activation priorities in the activation scheme.

In response to determining that the wake-up scenario is a request for viewing the real-time feed, the audio and video data collection module, the audio and video data transmission module, the monitoring object analysis module, and the memory management module may be activated respectively in the order of activation according to their activation priorities in the activation scheme.

In response to determining that the wake-up scenario is a request for watching the recorded video, the audio and video data collection module, the memory management module, the audio and video data transmission module, and the monitoring object analysis module may be activated respectively in the activation order according to their activation priorities in the activation scheme.

According to an embodiment of the present disclosure, a computer-readable storage medium storing a computer program may also be provided, wherein when the computer program is executed by at least one processor, the at least one processor is caused to execute an example according to the present disclosure. Any of the above methods of exemplary embodiments. Examples of computer readable storage media herein include: read-only memory (ROM), random access programmable read-only memory (PROM), electrically erasable programmable read-only memory (EEPROM), random access memory (RAM), dynamic random access memory (DRAM), static random access memory (SRAM), flash memory, non-volatile memory, CD-ROM, CD-R, CD+R, CD-RW, CD+RW, DVD-ROM, DVD-R, DVD+R, DVD-RW, DVD+RW, DVD-RAM, BD-ROM, BD-R, BD-R LTH, BD-RE, Blu-ray or optical disc memory, hard disk drive (HDD), solid state disk (SSD), card memory such as, a Multimedia Card, a Secure Digital (SD) card or an Extreme Digital (XD) card, a magnetic tape, a floppy disk, a magneto-optical data storage device, an optical data storage device, a hard disk, a solid-state disk and any other device that is configured to store and provide a computer program and any associated data, data files and data structures in a non-transitory fashion to a processor or computer so that the processor or computer can execute the computer program. The instructions or computer program in the computer readable storage medium described above may run in an environment deployed in computer equipment such as a client, host, proxy device, server, etc. Further, in one example, the computer program and any associated data, data files, and data structures are distributed across networked computer systems so that the computer program and any associated data, data files, and data structures are stored, accessed, and executed in a distributed fashion by one or more processors or computers.

Those skilled in the art will appreciate that the above illustrative embodiments are described herein and are not intended to be limiting. It should be understood that any two or more of the embodiments disclosed herein may be combined in any combination. Additionally, other embodiments may be utilized, and other changes may be made, without departing from the spirit and scope of the subject matter presented herein. It will be readily understood that the aspects of the invention of the present disclosure, as generally described herein, and illustrated in the figures, may be arranged, substituted, combined, separated, and designed in a wide variety of different configurations, all of which are contemplated herein.

Those of skill in the art will appreciate that the various illustrative logical blocks, modules, circuits, and steps described herein may be implemented as hardware, software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such design decisions should not be interpreted as causing a departure from the scope of the present application.

The various illustrative logical blocks, modules, and circuits described herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described herein may be embodied directly in hardware, in a software module executed by a processor, or in a combination of the two. A software module may reside in RAM memory, flash memory, ROM memory, EPROM memory, EEPROM memory, registers, hard disk, a removable disk, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored or transmitted over as one or more instructions or code on a computer-readable medium. Computer-readable media includes both computer storage media and communication media including any medium that facilitates transfer of a computer program from one place to another. Storage media may be any available media that may be accessed by a general purpose or special purpose computer.

The above descriptions are only exemplary embodiments of the present application and are not intended to limit the scope of protection of the present application, which is determined by the appended claims.

What is claimed is:

1. A method of waking up a camera, comprising:
   acquiring at least one wake-up signal for waking up the camera;
   performing pre-determined signal processing on the acquired wake-up signal to extract indicative features;
   determining wake-up scenario information corresponding to the acquired wake-up signal based on the indicative features;
   determining, based on the determined wake-up scenario information, an activation scheme corresponding to the wake-up scenario information, wherein the activation scheme defines activation priorities of at least two functional modules in the camera in the wake-up scenario;
   determining an activation order of the at least two functional modules based on activation priorities defined in the determined activation scheme; and
   activating the at least two functional modules for the wake-up scenario based on the determined activation order of the at least two functional modules.

2. The method of claim 1, wherein the at least one wake-up signal is acquired via at least one of a sensor and a network communication module.

3. The method of claim 2, wherein the sensor is configured to detect the presence of a target object to generate the wake-up signal, and the network communication module is configured to obtain a user request via the network and generate the wake-up signal based on the user request.

4. The method of claim 1, wherein the wake-up signal is acquired in response to at least one of the following events:
   detecting the presence of a target object,
   receiving a request for viewing a real-time feed; and
   receiving a request for watching a recorded video.

5. The method of claim 4, wherein in response to the request for viewing the real-time feed is received, the wake-up signal comprises the indicative features indicating that the request is a request for a real-time feed, or
   in response to the request for watching the recorded video is received, the wake-up signal includes the indicative features indicating that the request is a request for watching the recorded video.

6. The method of claim 1, wherein determining the activation scheme corresponding to the wake-up scenario information is further based on at least one of: network conditions, user preferences, and remaining power conditions.

7. The method of claim 4, wherein the at least two functional modules comprise at least two of: an audio and video data acquisition module, a monitoring object analysis module, a memory management module, and an audio and video data transmission module.

8. The method of claim 7, wherein
   in response to acquiring the wake-up signal due to detection of the presence of the target object, it is determined that the wake-up scenario information indicates a target trigger scenario, and a first activation scheme is determined in which the audio and video data collection module has the highest activation priority, and the monitoring object analysis module has the second highest activation priority; or
   in response to acquiring the wake-up signal due to reception of the request for viewing the real-time feed, it is determined that the wake-up scenario information indicates the scenario of triggering the real-time feed, and a second activation scheme is determined in which the audio and video data collection module has the highest activation priority, and the audio and video data transmission module has the second highest activation priority; or
   in response to acquiring the wake-up signal due to reception of the request for watching the video, it is determined that the wake-up scenario information indicates the scenario of triggering the recorded video, and a third activation scheme is determined in which the audio and video data collection module has the highest activation priority, and the memory management module has the second highest priority.

9. The method of claim 4, wherein the indicative features are associated with at least one of signal source of the wake-up signal and content included in the wake-up signal.

10. A camera comprising:
    a wake-up signal acquisition module configured to acquire at least one wake-up signal for waking up the camera;
    a microprocessor configured to perform pre-determined signal processing on the acquired wake-up signal to extract indicative features, and determine wake-up scenario information corresponding to the wake-up signal based on the indicative features; and
    a main chip configured to be woken up in response to the wake-up signal sent by a microprocessor and including a plurality of functional modules each configured to implement at least one function of a camera,
    wherein the main chip is further configured to determine an activation scheme corresponding to the wake-up scenario information based on the wake-up scenario information received from the microprocessor, wherein the activation scheme defines activation priorities of at least two functional modules in the camera in the wake-up scenario, determine an activation order of the at least two functional modules based on activation priorities defined in the determined activation scheme, and activate the at least two functional modules for wake-up scenario based on the determined activation order of the at least two functional modules.

11. The camera of claim 10, wherein the wake-up signal acquisition module comprises a sensor and a network communication module.

12. The camera of claim 11, wherein the sensor is configured to detect the presence of a target object, and the network communication module is configured to obtain a user request via a network.

13. The camera of claim 10, wherein the wake-up signal acquisition module acquires the wake-up signal in response to at least one of: a presence of a target object within a monitoring area of the camera, receiving a request for viewing real-time feed, and receiving a request for watching a recorded video.

14. The camera of claim 13, wherein, in response to receiving a request for viewing the real-time feed, the wake-up signal includes the indicative features indicating that the request is a request for a real-time feed, or in response to receiving a request for watching the recorded video, the wake-up signal includes the indicative features indicating that the request is a request for watching the recorded video.

15. The camera of claim 10, wherein the activation scheme corresponding to the wake-up scenario information is further determined based on at least one of: network conditions, user preferences, and remaining power conditions.

16. The camera of claim 13, wherein the at least two functional modules include at least two of: an audio and video data acquisition module, a monitoring object analysis module, a memory management module, and an audio and video data transmission module.

17. The camera of claim 16, wherein in response to the wake-up signal acquisition module acquiring the wake-up signal due to detection of the presence of the target object, the microprocessor is configured to determine that the wake-up scenario information indicates a target trigger scenario, and the main chip is configured to determine a first activation scheme in which the audio and video data collection module has the highest activation priority, and the monitoring object analysis module has the second highest activation priority; or in response to the wake-up signal acquisition module acquiring the wake-up signal due to reception of the request for viewing the real-time feed, the microprocessor is configured to determine that the wake-up scenario information indicates the scenario of triggering the real-time feed, and the main chip is configured to determine a second activation scheme is determined in which the audio and video data collection module has the highest activation priority, and the audio and video data transmission module has the second highest activation priority; or in response to the wake-up signal acquisition module acquiring the wake-up signal due to reception of the request for watching the video, the microprocessor is further configured to determine that the wake-up scenario information indicates the scenario of triggering the recorded video, and the main chip is configured to determine a third activation scheme in which the audio and video data collection module has the highest activation priority, and the memory management module has the second highest priority.

18. The camera of claim 11, wherein the network communication module is an Internet of Things (IoT) wireless communication module and the sensor is a passive infrared sensor (PIR) sensor.

19. The camera of claim 13, wherein the indicative features are associated with at least one of signal source of the wake-up signal and content included in the wake-up signal.

20. The camera of claim 10, wherein the camera includes a surveillance camera connected to a network.

* * * * *